United States Patent
Clayman

(10) Patent No.: US 8,079,132 B2
(45) Date of Patent: Dec. 20, 2011

(54) METHOD FOR SHIELDING RFID TAGGED DISCARDED ITEMS IN RETAIL, MANUFACTURING AND WHOLESALE INDUSTRIES

(76) Inventor: Henry Clayman, Miami, FL (US)

( * ) Notice: Subject to any disclaimer, the term of this patent is extended or adjusted under 35 U.S.C. 154(b) by 260 days.

(21) Appl. No.: 12/400,163

(22) Filed: Mar. 9, 2009

(65) Prior Publication Data
US 2009/0230020 A1    Sep. 17, 2009

Related U.S. Application Data

(60) Provisional application No. 61/035,477, filed on Mar. 11, 2008.

(51) Int. Cl.
*G01R 31/28* (2006.01)
(52) U.S. Cl. ............. 29/593; 29/600; 29/403.1; 29/559; 29/705; 343/702; 343/841
(58) Field of Classification Search .................... 29/600, 29/601, 832, 848, 854, 403.1, 418, 559, 701, 29/705, 593; 174/350, 377, 382, 391, 36, 174/138 A; 340/10.1, 568.1, 571, 572.1–572.9, 340/693.5; 343/700 MS, 702, 841; 361/139, 361/142, 159, 600, 816, 818
See application file for complete search history.

(56) References Cited

U.S. PATENT DOCUMENTS

| | | |
|---|---|---|
| 3,341,102 A | 9/1967 | Stephens et al. |
| 4,110,552 A | 8/1978 | Lombardi |
| 4,215,796 A | 8/1980 | Johnston et al. |
| 4,331,285 A | 5/1982 | Gottwals |
| 4,567,317 A | 1/1986 | Ehrlich et al. |
| 4,851,610 A | 7/1989 | LeBlanc et al. |
| 5,030,807 A | 7/1991 | Landt et al. |
| 5,055,659 A | 10/1991 | Hendrick et al. |
| 5,347,263 A | 9/1994 | Carroll et al. |
| 5,430,441 A | 7/1995 | Bickley et al. |
| 5,446,447 A | 8/1995 | Carney et al. |
| 5,497,140 A | 3/1996 | Tuttle |
| 5,527,989 A | 6/1996 | Leeb |
| 5,528,222 A | 6/1996 | Moskowitz et al. |
| 5,530,702 A * | 6/1996 | Palmer et al. .................. 370/445 |
| 5,566,441 A | 10/1996 | Marsh et al. |
| 5,661,473 A | 8/1997 | Paschal |
| 5,682,143 A | 10/1997 | Brady et al. |
| 5,955,951 A | 9/1999 | Wischerop et al. |
| 6,018,299 A | 1/2000 | Eberhardt |
| 6,025,780 A | 2/2000 | Bowers et al. |
| 6,107,910 A | 8/2000 | Nysen |
| 6,520,544 B1 | 2/2003 | Mitchell et al. |
| 6,580,358 B1 | 6/2003 | Nysen |
| 6,717,507 B1 | 4/2004 | Bayley et al. |

(Continued)

*Primary Examiner* — Derris Banks
*Assistant Examiner* — Jeffrey T Carley
(74) *Attorney, Agent, or Firm* — Berenato & White, LLC

(57) ABSTRACT

A method for shielding discarded or unwanted items provided with a Radio Frequency Identification (RFID) tag, comprises the following steps. First, a facility containing an inventory including a plurality of products each including a radio frequency identification (RFID) tag is provided. Then, the facility is provided with an RFID waste collection container defining a magnetic shielding enclosure for shielding and electromagnetically isolating the RFID tags when the products are disposed therein. Next, it is determined if one of the plurality of products is not wanted. Subsequently, the unwanted product is discarded by placing the unwanted product into the RFID waste collection container so that the RFID tag of the unwanted product does not interfere with ongoing activities in the facility by emitting errant signals.

7 Claims, 4 Drawing Sheets

U.S. PATENT DOCUMENTS

| | | |
|---|---|---|
| 6,778,847 B2 | 8/2004 | Wu et al. |
| 6,806,808 B1 | 10/2004 | Watters et al. |
| 7,026,935 B2 | 4/2006 | Diorio et al. |
| 7,112,356 B2 | 9/2006 | Nomula et al. |
| 7,163,152 B2 | 1/2007 | Osborn et al. |
| 2003/0067381 A1 | 4/2003 | Mitchell |
| 2003/0132301 A1 | 7/2003 | Selker |
| 2004/0183742 A1* | 9/2004 | Goff et al. ............... 343/867 |
| 2005/0152363 A1 | 7/2005 | Malik et al. |
| 2005/0242957 A1* | 11/2005 | Lindsay et al. ............ 340/572.7 |
| 2005/0255262 A1 | 11/2005 | Nomula et al. |
| 2006/0044206 A1* | 3/2006 | Moskowitz et al. ......... 343/841 |
| 2006/0047570 A1 | 3/2006 | Lenerking et al. |
| 2006/0055552 A1* | 3/2006 | Chung et al. ............... 340/686.1 |
| 2006/0080819 A1 | 4/2006 | McAllister |
| 2006/0187046 A1 | 8/2006 | Kramer |
| 2006/0187061 A1* | 8/2006 | Colby ..................... 340/572.8 |
| 2006/0254815 A1* | 11/2006 | Humphrey et al. ........... 174/380 |
| 2006/0290502 A1 | 12/2006 | Rawlings |
| 2007/0008121 A1 | 1/2007 | Hart |
| 2007/0152829 A1* | 7/2007 | Lindsay et al. ............ 340/572.3 |
| 2007/0182563 A1 | 8/2007 | Abbott |
| 2008/0094222 A1* | 4/2008 | Kaoru ..................... 340/572.7 |
| 2010/0164710 A1* | 7/2010 | Chung et al. ............... 340/539.1 |

* cited by examiner

METHOD FOR SHIELDING RFID TAGGED DISCARDED ITEMS IN RETAIL, MANUFACTURING AND WHOLESALE INDUSTRIES

CROSS-REFERENCE TO RELATED APPLICATION

This application is a U.S. Utility Patent Application based on U.S. Provisional Patent Application No. 61/035,477 filed Mar. 11, 2008, which is hereby incorporated by reference in its entirety and to which priority is claimed.

BACKGROUND OF THE INVENTION

1. Field of the Invention

The present invention relates to a method for shielding discarded or unwanted items provided with a Radio Frequency Identification (RFID) tag.

2. Description of the Prior Art

Various technologies have been developed for identifying and tracking objects. The most common involves application of identifying bar codes to objects and optically scanning those codes to identify the objects or certain other relevant coded characteristics, e.g., size, model, price, etc. A more recent development is radio frequency identification technology, commonly known as RFID technology. RFID devices, commonly called RFID tags, are thin transponders (transceivers) that include an integrated circuit chip having RF (radio frequency) circuits, control logic and memory, plus an antenna, all mounted on a supporting substrate. RFID devices are either of the active type or passive type. The active type RFID tags include a battery for powering a transceiver. The passive type RFID tags have no battery and derive its energy from the RF signal used to interrogate it. The RFID transponder operates to receive, store and transmit object-identifying data to and from the memory within the chip. The device functions in response to coded RF signals received from a base station. Typically it reflects the incident RF carrier back to the base station, and information stored in the device is transmitted back to the interrogating base station by modulating the reflected signal according to the programmed information protocol.

Recent developments have produced thin RFID tags on flexible organic substrates, with the overall thickness of the tags being of the order of a fraction of a millimeter. Various materials have been used as the organic substrate of commercial RFID tags, including but not limited to thin flexible films of polyester such as Mylar®™ or a polyimide such as Kapton®™. The antenna may comprise preformed wires that are attached to the substrate, but more commonly it is a thin film element, usually consisting of copper lines formed by plating copper onto the flexible organic substrate or by etching in the case where the substrate is a copper/organic material laminate. Further information regarding the manufacture and use of RFID transponders is provided by U.S. Pat. No. 5,497,140, issued Mar. 5, 1996 to J. R. Tuttle; U.S. Pat. No. 5,528,222, issued Jun. 18, 1996 to P. A. Moskowitz et al.; U.S. Pat. No. 5,566,441, issued Oct. 22, 1996 to M. J. C. Marsh et al.; U.S. Pat. No. 5,661,473, issued Aug. 26, 1997 to J. P. Paschal; U.S. Pat. No. 5,682,143, issued Oct. 28, 1997 to M. J. Brady et al.; U.S. Pat. No. 5,955,951, issued Sep. 21, 1999, and U.S. Pat. No. 6,018,299, issued Jan. 25, 2000 to N. H. Eberhardt. The greatest disadvantage of bar codes is that they are not dynamic carriers of information, require direct or proximal line of sight contact for reading and are adversely impacted by dirt, grime and soiling. With bar codes the stored information is static. Consequently information stored in bar codes on an object cannot be updated as it travels, for example, from a shipper to a receiver. In contrast, RFID tags are programmable and offer the capability of updating recorded information at any time and in real time. RFID transponders are of particular value to industries that need to quickly and accurately track and manage very large numbers of objects. The passive type of RFID tag is particularly valuable in relation to inventory management and control because it offers a long life data storage and retrieval capability, since it draws its energy and transfers information in the form of low power radio waves resulting from operation of the read/write module of a base station.

Small lightweight RFID foil tags have long been implemented in security systems in retail stores. The foil RFID tag is secured to a product and is capable of storing information regarding the product or sale status. A RFID interrogator is used to read the tag, record the sale of the item, and write to the tag to change the status to purchased, to allow the product and tag to leave the store without tripping the stores security alert system. The technology to use such RFID tags for inventory and assembly lines etc. are known in the art to facilitate reading and writing to small RFID foil tags without contact and without the need for a power supply to the tag itself. Rather, the tag relies on modulated radio frequencies from the RFID reader/writer to exchange information. Various RFID systems are disclosed in U.S. Pat. Nos. 6,717,507; 6,806,808; 5,055,659; 5,030,807; 6,107,910; 6,580,358; and 6,778,847 each of which are hereby incorporated herein by reference.

The energy returned to the RFID reader (interrogator) is at low power levels to prevent scatter and to control the signal path. These signals are returned to the reader over a narrow field and their reception may be compromised by interference from devices capable of emitting radio-frequency signals such as cordless phones, computers, manufacturing equipment etc.

In retail, manufacturing or wholesale industries, among possible causes of signal contamination would be carelessly discarded RFID tags or discarded and/or unwanted items (objects), such as retail products or goods, tagged with this technology. For example in a supermarket warehouse setting, an empty RFID carton may be left on a shelf after the contents have been removed to stock the retail portion of the store. If the tag has not been inactivated, when the inventory is checked, the signal could be diluted or incorrectly signal that the carton is in stock, albeit empty, and therefore the inventory will read at a higher quantity. Another supermarket or retail store scenario could take place at checkout where a customer decides that a certain item (RFID tagged) is not wanted and the cashier puts it aside till it can be later collected and returned to inventory. If this item is in the vicinity of the reader it could compromise the signal or be read and falsely added to the customer's bill or that of the next customer in line. Other examples include tracking RFID material from freight cars which, if thrown away like a candy wrapper, would continue to emit a signal (if not deactivated) which could interfere with the reader.

With this in mind, a need exists to develop a method for shielding or disposing products or goods that include an RFID tag in a non-destructive manner in retail and other industries so as to isolate the RFID tag from the RFID tag reader.

SUMMARY OF THE INVENTION

The present invention is directed to a novel method for shielding discarded or unwanted products provided with a Radio Frequency Identification (RFID) tag.

The method according to the present invention comprises the following steps. First, a facility containing an inventory including a plurality of products each including a radio frequency identification (RFID) tag is provided. Then, the facility is provided with an RFID waste collection container defining a magnetic shielding enclosure for shielding and electromagnetically isolating the RFID tags when the products are disposed therein. Next, it is determined if one of the plurality of products is not wanted. Subsequently, the unwanted product is discarded by placing the unwanted product into the RFID waste collection container so that the RFID tag of the unwanted product does not interfere with ongoing activities in the facility by emitting errant signals.

Therefore, the present invention provides a novel non-destructive method for shielding discarded items provided with an RFID tag without disabling or physically destroying the RFID tag.

BRIEF DESCRIPTION OF THE DRAWINGS

Other objects and advantages of the present invention will become apparent from a study of the following specification when viewed in light of the accompanying drawings, wherein.

DETAILED DESCRIPTION OF PREFERRED EMBODIMENTS

Figure 1A:
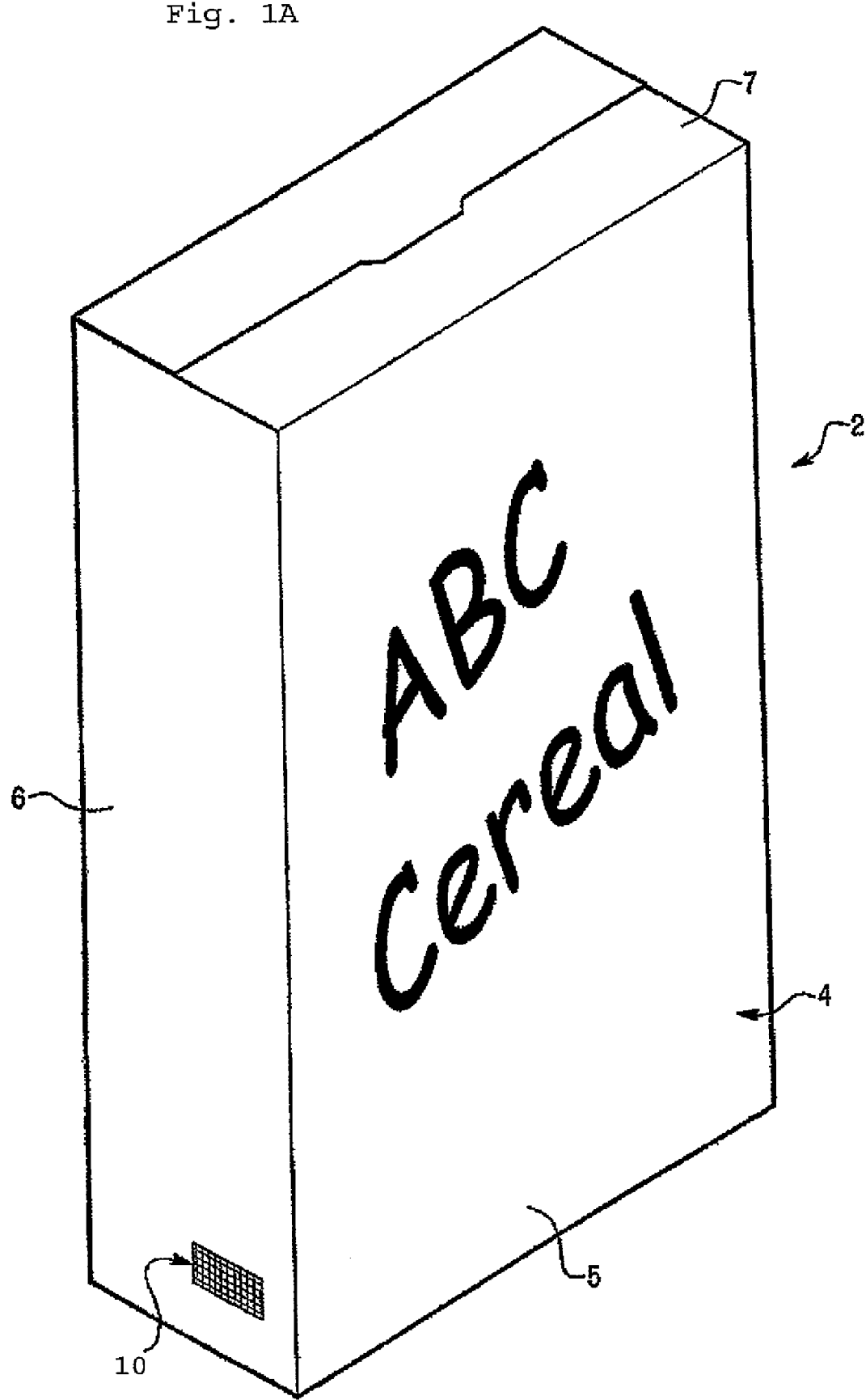
FIG. 1A is a perspective view of a retail item provided with an RFID tag attached to a retail product according to the preferred exemplary embodiment of the present invention.

The preferred embodiment of the present invention will now be described with the reference to accompanying drawings.

For purposes of the following description, certain terminology is used in the following description for convenience only and is not limiting. The words "top", "bottom", "right," "left," "lower," and "upper" designate directions in the drawings to which reference is made. The words "uppermost" and "lowermost" refer to position in a vertical direction relative to a geometric center of the apparatus of the present invention and designated parts thereof The terminology includes the words above specifically mentioned, derivatives thereof and words of similar import. Additionally, the word "a" as used in the claims means "at least one".

Figure 1B:
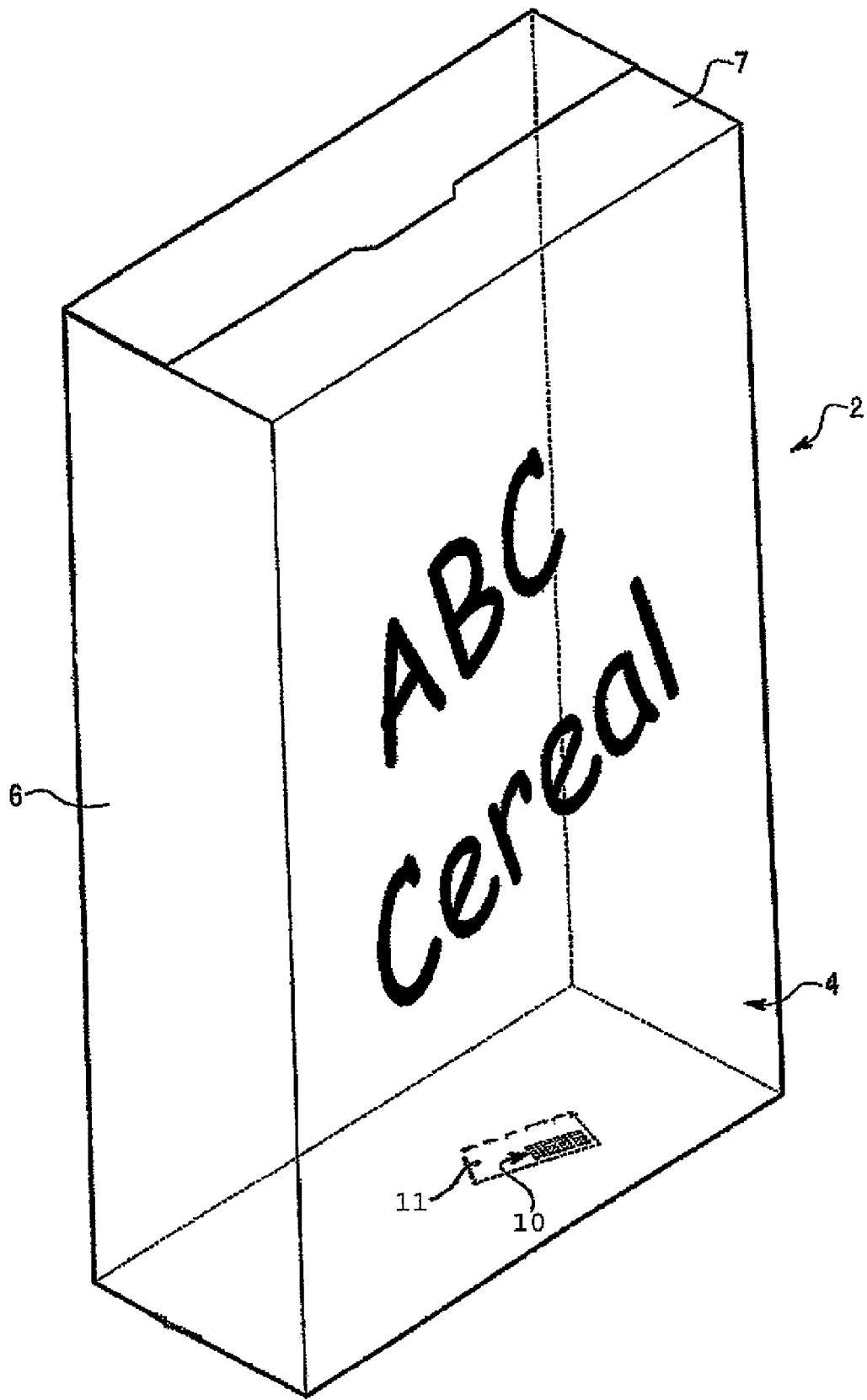
FIG. 1B is a perspective view of a retail product provided with the RFID tag within a box of the retail product according to the alternative embodiment of the present invention loose.

In the exemplary embodiment illustrated in FIG. 1A, an article or retail item (or product) 2 is a box 4 filled with cereal or corn flakes. The box 4 has opposite front and rear walls 5, opposite side walls 6, and opposite top and bottom walls 7. The box 4 is provided with a radio frequency identification (RFID) tag 10 secured to one of the walls 4, 5 or 6 of the box 4. In the exemplary embodiment of FIG. 1A, the RFID tag 10 is attached to one of the side walls 6. Alternatively, the RFID tag 10 may be separate from the box 4 and located inside thereof, as illustrated in FIG. 1B. Further alternatively, the RFID tag 10 may be attached or printed directly on one of the walls 4 or 6 of the box 4.

The RFID tag 10 is provided for storing various data related to the article or retail item 2 associated with the RFID tag 10 (including a product identifying data, such as a common Electronic Product Code (EPC) stored by the RFID tag 10), which can be read by an RFID reader. Also, the RFID tag 10 may be associated with the discount coupon provided with the product 2. The RFID tag of the present invention may be both active and passive type. The RFID tag 10 may be attached or printed on the box 4 (as shown in FIG. 1A) or on a base sheet 11 of the RFID tag 10 (as shown in FIG. 1B).

Figure 2:
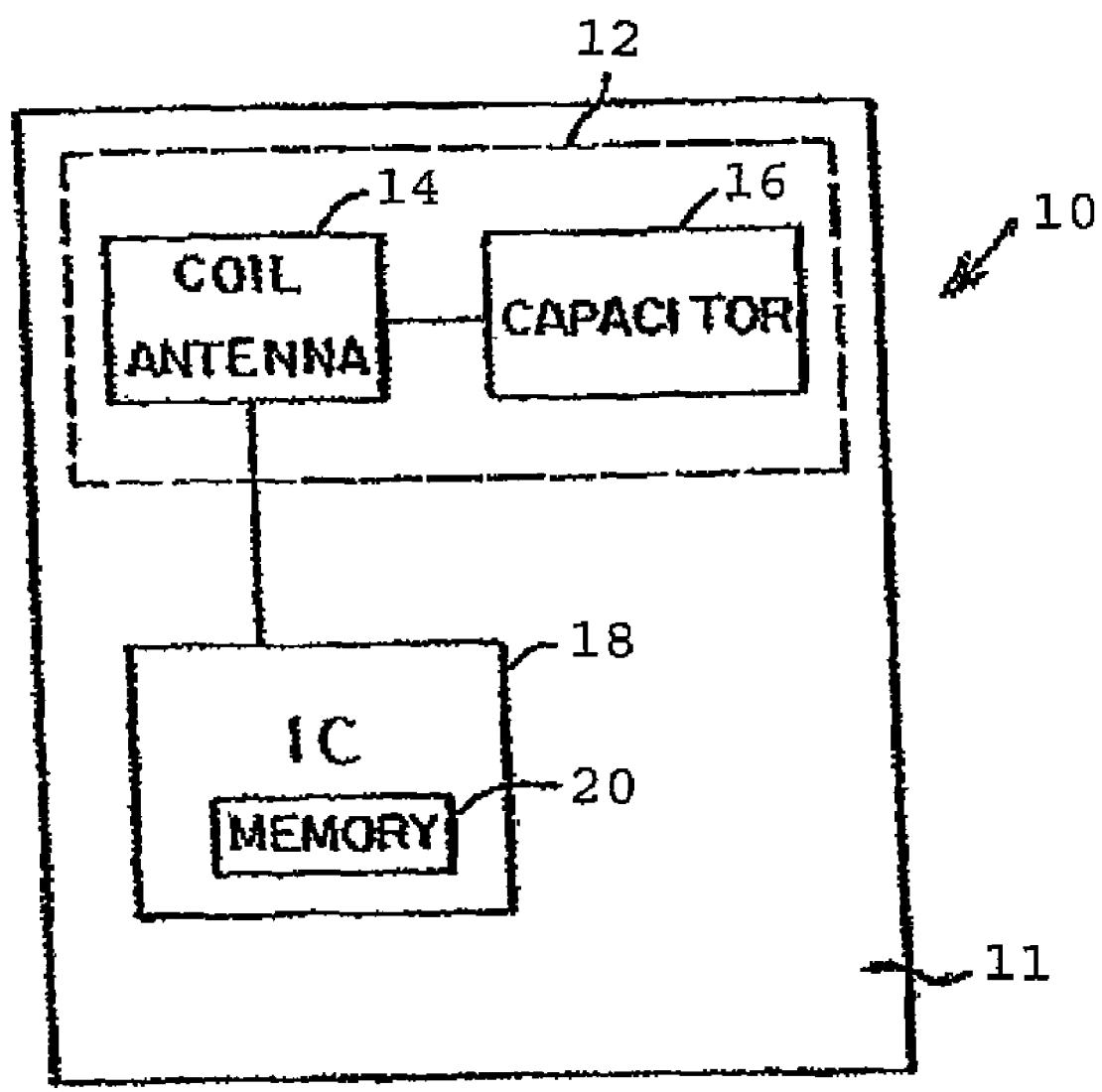
FIG. 2 is a schematic view of the RFID tag suitable for use with the exemplary embodiments of the present invention.

FIG. 2 schematically illustrates the exemplary embodiment of the RFID tag 10 suitable for use with the method of the present invention. The RFID tag 10 comprises a passive resonant radio frequency (RF) circuit 12 for use in detecting when the RFID tag 10 is within a zone monitored by a reader or interrogator, as is well-known in the art. One well-known type of circuit 12 has an antenna 14 and a capacitor 16 which together form a resonant circuit with a predetermined resonant frequency i.e., the selected radio frequency determined by the values of the coil and the capacitor. Power for the RFID tag 10 is derived from an incident signal to the antenna 14 in a conventional manner. Furthermore, the RFID tag 10 includes an integrated circuit (IC) 18 for providing "intelligence" to the RFID tag 10. The IC 18 is electrically connected to the resonant circuit 12. The capacitor 16 may be either external to the IC 18, or the capacitor 16 may be within the IC 18, depending upon the desired implementation of the circuit 12. The IC 18 includes a programmable memory 20, such as a 20 bit memory, for storing bits of identification data. The IC 18 outputs a data stream comprised of the stored data (i.e. 20 bits in the present embodiment) when sufficient power from the antenna 14 is applied thereto. In one embodiment of the invention, the data stream creates a series of data pulses by switching an extra capacitor (not shown) across the antenna 14 for the duration of the data pulses. The addition of the extra capacitor changes the resonant frequency of the RF circuit 12, detuning it from the operational frequency. Thus, instead of the RF circuit 12 returning a simple single frequency response signal, it returns a signal containing a packet of preprogrammed information. The packet of information (data pulses) is received and processed by interrogator receiving circuitry and is decoded (if necessary) to provide identification information about the retail item 2 to which the RFID tag 10 is secured or attached. Other methods of using the data in the IC memory 20 to output identification data from the RFID tag 10 are within the scope of the invention. The IC 18 is preferably also a passive device and is powered in the same manner as the RF circuit 12 (i.e., by using energy received at the antenna 14 from the interrogator transmitter signal). It will be appreciated that any type of RFID tags is within the scope of the present invention. Examples of other RFID tags which are suitable for use as the RFID tag 10 of the present invention are shown in U.S. Pat. No. 5,446,447 (Carney et al.); U.S. Pat. No. 5,430,441 (Bickley et al.); and U.S. Pat. No. 5,347,263 (Carroll et al.). Typically, RFID tags are not physically deactivatable. In other words, no physical change or change of magnetic state occurs to the state of the coil, capacitor or any other element comprising the antenna circuit of such RFID tags. RFID tags which are not physically deactivatable have significant advantages over physically deactivatable RFID tags which are commonly used today because such REID tags are more difficult to bypass. Preferably, the RFID tag 10 is non-physically deactivatable RFID tag. Alternatively, the physically deactivatable RFID tag may be used. Although the preferred embodiment of the RFID tag 10, illustrated in FIG. 2, includes a resonant circuit having an antenna and a capacitor and an IC, an RFID tag which has only a coil antenna and an IC is also within the scope of the present invention.

The information (data pulses) stored in the programmable memory 20 of the RFID tag 10 provides various data related to the retail product 2 with which the RFID tag 10 is associated. According to the present invention, the RFID tag 10 stores data identifying the retail product 2, and additional data other than the product identifying data, such as an amount of discount on the retail product 2. The data identifying the retail product usually includes a product name, a brand name (manufacturer ID), and a product identification number. The amount of discount includes a monetary amount of discount from the regular retail price of the product 2. The monetary discount can be taken at checkout, or the customer can redeem the discount at a subsequent shopping trip. With the latter consumer information can thus be obtained on frequency and location of purchases, for example. Preferably, the additional data stored in the REID tag 10 is information related to utilization of the retail product 2. The information related to utilization of the retail product 2 may include a number of various data useful to consumer of the product 2, such as one of recipes that include the product 2, information on how to store the product 2 at home, nutritional value of the product 2, etc.

Figure 3:
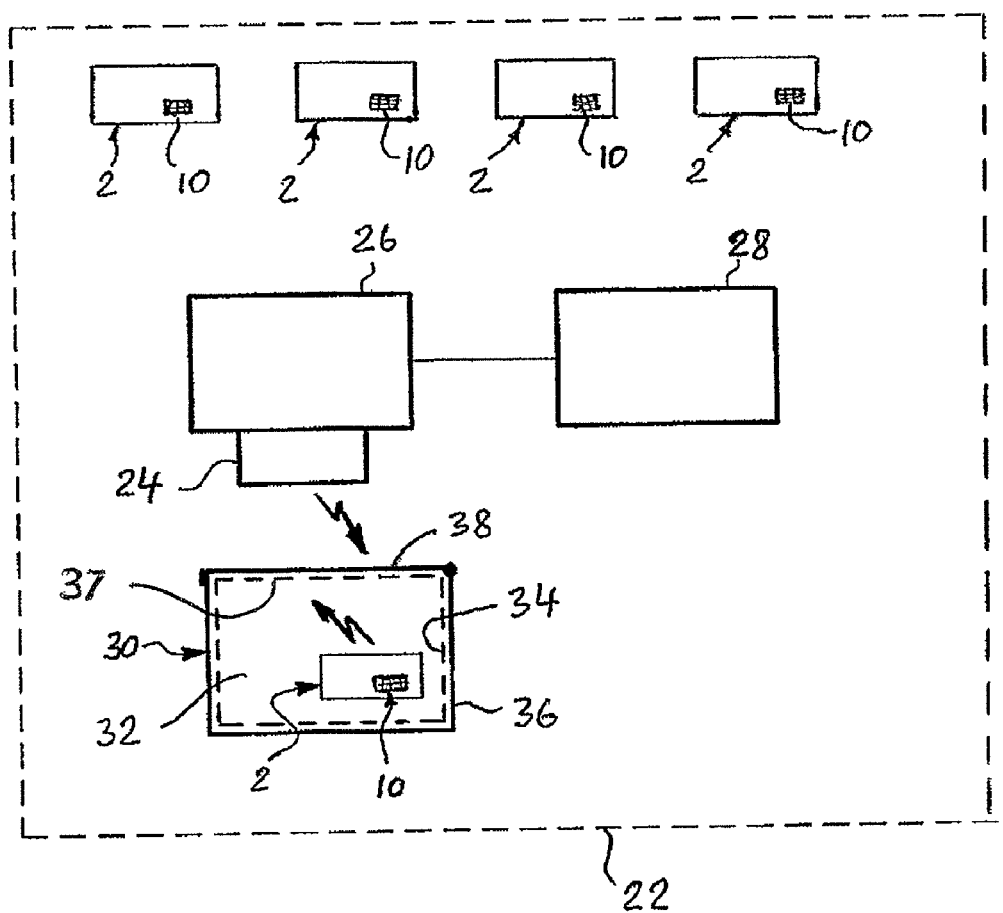
FIG. 3 is a schematic view of a retail store using a method of shielding retail products or goods with the RFID tag according to the preferred exemplary embodiment of the present invention.

The method of the present invention can be executed in a number of various embodiments. For example, in operation in a retail store (or facility) 22 having an inventory including a plurality of the retail products 2 each provided with the REID tag 10, as illustrated in FIG. 3, the data identifying the retail product 2 related to the RFID tag 10 and its price is read by an RFID reader 24 at a cashier station 26 (point-of-sale checkout). The cashier station 26 is electronically connected to a retail store database 28.

According to the present invention, the cashier station 26 in the retail store 22 is provided with one or more RFID waste collection containers 30 located adjacent to the RFID reader 24. Each of the RFID waste collection containers 30 is provided for storing and carrying one or more retail items 2 tagged with the RFID tag 10. The RFID waste collection container 30 is constructed so as to define a magnetic shielding enclosure 32 that shields the RFID tag 10 disposed therein from the RFID reader 24 at the cashier station 26 or any other reader or interrogator of RFID devices. Preferably, the RFID waste collection container 30 employs the principle of the Faraday Cage. Specifically, the magnetic shielding enclosure of the RFID waste collection container 30 includes a magnetic shielding layer 34 which provides a substantially continuous electrical path surrounding the enclosure, thus blocking external electromagnetic fields and electromagnetically isolating the electromagnetic devices, such as the RFID devices. The specific structure and material of the shielding layer 34 would depend on the radio frequency wavelength of the discarded material and may range from household aluminum foil to more sophisticated products such as those with a ferrite base, for example as manufactured by Ferrishield, Inc. Preferably, the RFID waste collection container 30 includes a receptacle 36 defining the magnetic shielding enclosure 32 therewithin and having an opening 37 providing access to the enclosure 32, and a lid (closure member) 38, such as a hinged lid, for selectively closing and accessing the opening 37 of the receptacle 36.

If at checkout (the cashier station 26) a customer decides that a certain RFID tagged item, such as the retail item 2, is not wanted, the cashier or the customer places the retail items 2 into the RFID waste collection container 30 till it can be later collected and returned to inventory. It will be appreciated that the disposed or unwanted RFID tagged retail items 2 placed into the RFID waste collection container 30 will not interfere with ongoing commercial activities by emitting errant signals which may confound the reader as the RF signals cannot reach the REID tag 10 or be returned to the reader 24. In other words, the RFID tag 10 is temporarily removed from a zone of detection.

Although the method for shielding discarded or unwanted products of the present invention is described and illustrated with the reference to the retail facilities (in retail industry), it will be appreciated that the present invention may also be used in the manufacturing or wholesale facilities storing an inventory including a plurality of products provided with RFID tags The design of the container depends on its proposed use and could be a familiar garbage bag of any capacity lined with a shielding material and a secure closure. If sharp objects were to be disposed which might perforate the shielding material then an inner plastic bag could be utilized where the shielding material is sandwiched between two layers of plastic. The thickness of the plastic bag would depend on the cumulative weight of the disposed objects. Similarly a cardboard or plastic carton may be used as the container and would similarly require a shielding liner as would pre-existent plastic garbage bins, all with secure shielded closures. These shielded containers, when fall, could be discarded in the usual manner such as in commercial dumpsters or any other means. A metal dumpster with a metallic lid is a Faraday Cage, as long as the lid is closed. These lids are heavy and frequently these dumpsters are left with the lids open which could negate shielding of the contents. In another embodiment a retractable sheet of shielding could be fixed on a roller to one side of the dumpster and extended and retracted, as required, much like an automobile tonneau cover. Some dumpsters do not have lids and the above embodiment would be useful in this contingency when material is disposed of in such containers. Various containers providing magnetic shielding enclosures are disclosed in U.S. Pat. Nos. 7,112, 356; 4,331,285; 4,215,796; and 3,341,102 each of which is incorporated herein by reference.

Therefore, the present invention provides a novel non-destructive method for shielding discarded items provided with an RFID tag without disabling or physically destroying the RFID tag.

The foregoing description of the preferred embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A method for shielding discarded or unwanted products, said method comprising the steps of:
    a) providing one of a retail facility, a wholesale facility and a manufacturing facility containing an inventory including a plurality of products each including a radio frequency identification (RFID) tag;

b) providing said facility with an RFID reader and an RFID waste collection container located in said facility adjacent to said RFID reader, said RFID waste collection container defining a magnetic shielding enclosure for shielding and electromagnetically isolating said RFID tags when said products being disposed therein;

c) determining if one of said plurality of products from said inventory is not wanted by a customer of said facility; and d) discarding said unwanted product by placing said unwanted product from said inventory refused by the customer in said facility into said RFID waste collection container until said unwanted product collected and returned to said inventory so that said RFID tag of said unwanted product does not interfere with ongoing activities in said facility by emitting errant signals.

2. The method for shielding discarded or unwanted items as defined in claim 1, further comprising the step of collecting said unwanted product from said RFID waste collection container and returning said unwanted product to said inventory.

3. The method for shielding discarded or unwanted items as defined in claim 1, wherein said RFID waste collection container includes a shielding layer providing a substantially continuous electrical path surrounding said enclosure for electromagnetically isolating said RFID tags and blocking external electromagnetic fields.

4. The method for shielding discarded or unwanted items as defined in claim 1, wherein said RFID waste collection container includes a receptacle defining said magnetic shielding enclosure therewithin and having an opening providing access to said magnetic shielding enclosure, and a lid for selectively closing said opening of said receptacle.

5. The method for shielding discarded or unwanted items as defined in claim 1, wherein said facility is a retail store including a checkout provided with said RFID reader and said RFID waste collection container.

6. The method for shielding discarded or unwanted items as defined in claim 1, wherein said facility is one of manufacturing and wholesale facilities.

7. The method for shielding discarded or unwanted items as defined in claim 1, wherein each of said RFID tags stores data including data identifying one of said products associated with each of said RFID tags.

* * * * *